United States Patent
Brunner et al.

(10) Patent No.: US 9,052,481 B2
(45) Date of Patent: Jun. 9, 2015

(54) METHOD, APPARATUS AND OPTICAL INTERCONNECT MANUFACTURED BY 3D PRINTING

(71) Applicant: Telefonaktiebolaget L M Ericsson (publ), Stockholm (SE)

(72) Inventors: Robert Brunner, Montreal (CA); Qing Xu, Montreal (CA); Stephane Lessard, Mirabel (CA); Martin Julien, Laval (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/028,886

(22) Filed: Sep. 17, 2013

(65) Prior Publication Data
US 2015/0078712 A1   Mar. 19, 2015

(51) Int. Cl.
*G02B 6/12* (2006.01)
*G02B 6/42* (2006.01)
*B29D 11/00* (2006.01)

(52) U.S. Cl.
CPC ........ *G02B 6/4219* (2013.01); *B29D 11/00663* (2013.01); *G02B 6/12002* (2013.01)

(58) Field of Classification Search
CPC ............................ G02B 6/138; G02B 6/12002
See application file for complete search history.

(56) References Cited

U.S. PATENT DOCUMENTS

| 4,472,020 A * | 9/1984 | Evanchuk ........................ 385/14 |
| 2011/0241233 A1 * | 10/2011 | Morita et al. ................ 264/1.28 |
| 2012/0084968 A1 | 4/2012 | Nath et al. |

FOREIGN PATENT DOCUMENTS

| GB | 2477828 A1 | 8/2011 |
| JP | 2000141497 A | 5/2000 |

OTHER PUBLICATIONS

Unknown, Author. "3D Printing on the Micrometer Scale." Nanoscribe Press Release, Feb. 6, 2013. pp. 1-3.
Lorang, et al. "Photocurable Liquid Core—Fugitive Shell Printing of Optical Waveguides." Advanced Materials, 2011. Wiley-VCH Verlag GmbH & Co. KGaA, 2011. pp. 1-4.
Willis, et al. "Printed Optics: 3D Printing of Embedded Optical Elements for Interactive Devices." UIST '12/ ACM, Oct. 2012. pp. 1-10.
Parker, et al. "Biocompatible Silk Printed Optical Waveguides." Advanced Materials, 2009, 21. Wiley-VCH Verlag GmbH & Co. KGaA, 2009. pp. 1-5.

* cited by examiner

*Primary Examiner* — Omar R Rojas
(74) *Attorney, Agent, or Firm* — Murphy, Bilak & Homiller, PLLC

(57) ABSTRACT

A method of manufacturing an optical interconnect includes 3D printing a plurality of non-intersecting and spaced apart optical waveguides from a material that guides electromagnetic waves in the optical spectrum after being cross-linked or polymerized in a region activated by the 3D printing. At least some of the optical waveguides change direction at least once by about 90°. The method further includes encasing at least each end of the optical waveguides with a material having a lower index of refraction than the material from which the optical waveguides are formed by 3D printing, to secure the optical waveguides. A corresponding 3D printing apparatus is also described.

9 Claims, 11 Drawing Sheets

METHOD, APPARATUS AND OPTICAL INTERCONNECT MANUFACTURED BY 3D PRINTING

TECHNICAL FIELD

The present invention generally relates to optical interconnects, and more particularly relates to optical interconnects with a plurality of waveguides for optical coupling.

BACKGROUND

Optical interconnects are a viable technical solution for ultra-high speed and high density interconnects in datacom and telecom infrastructures. Optical interconnects also provide a business solution for replacement of costly and bulky electrical cables and backplanes. Currently, the Clos network and corresponding derivative architectures are widely used for high scalability systems. The Clos Network consists of 3 stages: ingress stage; middle stage; and egress stage. A single connection is provided between each ingress stage switch and each middle stage switch. Each middle stage switch is connected exactly once to each egress stage switch. Passive optical point-to-point interconnects are required for high performance and high connectivity, with minimum packet loss and latency, as well as high system resilience. An optical fiber shuffle can provide such modularized connectivity. Optical fiber shuffles offer cross-connect fibers from multiple ribbon inputs to reconfigure multiple ribbon outputs. However, the shuffle box has a bulky size and high cost. The installation of a variety of topologies is also required. In addition, conventional optical cross-connect switch solutions such as MEMS (microelectromechanical systems) based switches, thermal-optical PLC (programmable logic controller) based switches, or silicon photonics switches are expensive, have high latency, and offer low reliability in high density large scale ICT (information and communications technology) systems such as cloud computing, data center applications, Ethernet switches, etc.

SUMMARY

Embodiments described herein provide an optical cross-connect for optical communication networks constructed using 3D (3-dimensional) printing. The optical cross-connect includes non-intersecting and spaced apart optical waveguides constructed from a material that guides electromagnetic waves in the optical spectrum after being cross-linked or polymerized in a region activated by the 3D printing. The embodiments described herein provide a methodology for forming very dense and numerous (e.g. thousands) of waveguide structures in a 3D space to fabricate optical cross-connects that can easily be aligned to an optical connector. The embodiments employ 3D nanolithography and patterned photo-sensitive material such as a polymer, epoxy, ceramic, or siloxane that becomes translucent when developed. The 3D optical waveguides are printed to avoid intersecting optical paths. Also, some waveguides can serve as structural members (beams, columns, wedges, etc.) and a thin-walled perimeter can be provided for mechanical support of the waveguide ends while serving as a framework for potting with cladding. Alignment structures can be provided for external waveguide attachment.

According to an embodiment of a method of manufacturing an optical interconnect, the method comprises: 3D printing a plurality of non-intersecting and spaced apart optical waveguides from a material that guides electromagnetic waves in the optical spectrum after being cross-linked or polymerized in a region activated by the 3D printing, at least some of the optical waveguides changing direction at least once by about 90°; and encasing at least each end of the optical waveguides with a material having a lower index of refraction than the material from which the optical waveguides are formed by 3D printing, to secure the optical waveguides.

According to an embodiment of a corresponding apparatus, the apparatus comprises a basin and a 3D printer. The basin is configured to hold material capable of guiding electromagnetic waves in the optical spectrum after being cross-linked or polymerized in a region activated by 3D printing. The 3D printer is configured to form a plurality of non-intersecting and spaced apart optical waveguides from the material held in the basin, at least some of the optical waveguides changing direction at least once by about 90°. The 3D printer is also configured to encase at least each end of the optical waveguides with a material having a lower index of refraction than the material from which the optical waveguides are formed by 3D printing, to secure the optical waveguides.

According to an embodiment of an optical interconnect, the optical interconnect comprises a plurality of non-intersecting and spaced apart optical waveguides 3D printed from a first material that guides electromagnetic waves in the optical spectrum after being cross-linked or polymerized in a region activated by 3D printing. At least some of the optical waveguides change direction at least once by about 90°. The optical interconnect further comprises a second material encasing at least each ingress and egress end of the optical waveguides to secure the optical waveguides in a block. The second material has a lower index of refraction than the first material.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
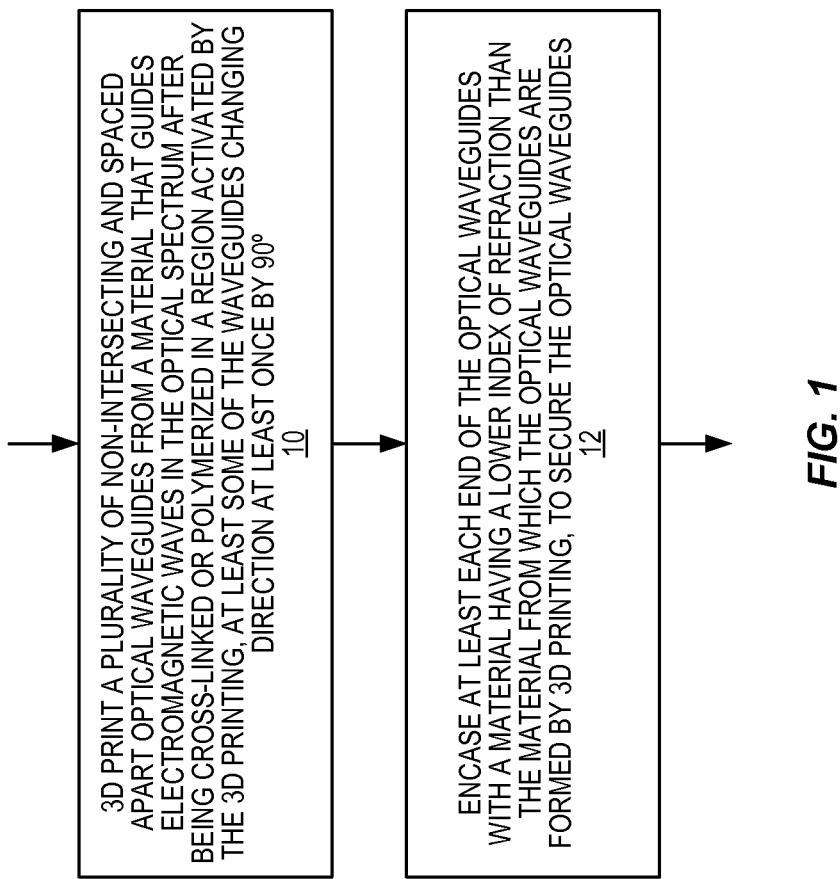
FIG. 1 is a flow diagram illustrating an embodiment of a method of manufacturing an optical interconnect having optical waveguides formed by 3D printing.

FIG. 1 illustrates an embodiment of a method of manufacturing an optical interconnect having optical waveguides formed by 3D printing. The method comprises 3D printing a plurality of non-intersecting and spaced apart optical waveguides from a material that guides electromagnetic waves in the optical spectrum after being cross-linked or polymerized in a region activated by the 3D printing (10). Additive manufacturing or 3D printing is a process of making a three-dimensional solid object of virtually any shape from a digital model. 3D printing is an additive process whereby successive layers of material are formed in different shapes. Any material that can be additively processed in this way to form optical waveguides can be used. For example, the material can be a polymer, epoxy, ceramic, or siloxane that becomes translucent when developed by 3D printing. In each case, at least some of the optical waveguides change direction at least once by about 90°. Such a sharp turning radius can be achieved using vertical column-like structures that redirect light at about 90° angles at each end, so that horizontal beam-like structures disposed in different horizontal planes can be connected at sharp angles by the vertical column-like structure to realize a single, continuous optical waveguide. The light propagating through the waveguides need not bend at 90° angles, but instead the waveguides can have multiple facets or curvatures (which can be decomposed as many facets). Further details of the optical waveguide geometries and construction are provided later herein.

The method of FIG. 1 further comprises encasing at least each end of the optical waveguides with a material having a lower index of refraction than the material from which the optical waveguides are formed by 3D printing, to secure the optical waveguides (12). This material provides mechanical support to the individual optical waveguides and can also be additively processed by 3D printing. Unlike the material from which the optical waveguides are 3D printed, the encasing material need not be translucent after being developed.

Figure 2:
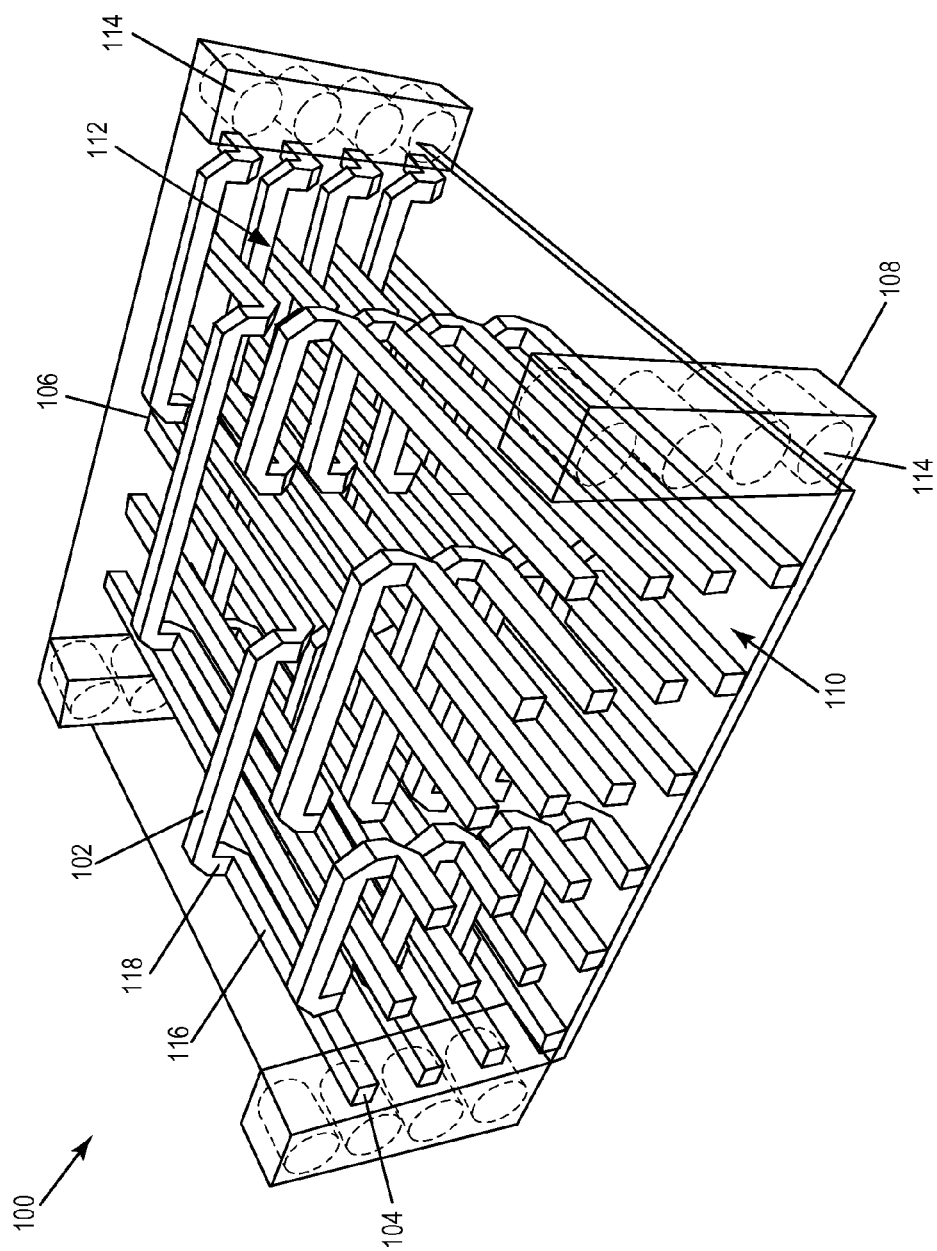
FIG. 2 is a perspective view of an embodiment of an optical interconnect having optical waveguides formed by 3D printing.

FIG. 2 illustrates an embodiment of an optical interconnect 100 manufactured in accordance with the 3D printing method of FIG. 1. The optical interconnect 100 includes a plurality of non-intersecting and spaced apart optical waveguides 102 which are 3D printed from a first material that guides electromagnetic waves in the optical spectrum (i.e. light, for example at a wavelength ranging between about 800 nm to about 2000 nm, or even 700 nm to 1 mm) after being cross-linked or polymerized in a region activated by 3D printing. At least some of the optical waveguides 102 change direction at least once by about 90°. At least the ingress and egress ends 104, 106 of the optical waveguides 102 are encased by a second material to secure the optical waveguides 102 in a block 108, the second material having a lower index of refraction than the first material. The material that forms the block 108 also permits potting of the optical waveguides 102 with a cladding medium (not shown) that encapsulates the waveguides 102 with a lower index of refraction, to promote light containment within the waveguides 102. The cladding can be air in case no second material is provided as a separate cladding. The thin wall envelope face 110 of the block 108 with the embedded waveguides 102 can be subsequently removed by a polishing/dicing process to create a connector interface.

In one embodiment, the material from which the optical waveguides 102 are formed by 3D printing is a first polymer and the material encasing at least each end of the optical waveguides 102 in a block 108 is a second polymer having a lower index of refraction than the first polymer. According to this embodiment, the optical waveguides 102 formed from the first polymer and the block 108 formed from the second polymer can be manufactured by removing the region of the first polymer that is undeveloped by 3D printing and surrounding the optical waveguides 102 with the second polymer after the undeveloped first polymer is removed. The second polymer is then developed at least in a region adjacent the ends 104, 106 of the optical waveguides 102 to harden the second polymer in this region to form the block 108. The undeveloped region of the second polymer is removed after the second polymer is hardened to form the block 108.

Both the first and second materials can be additively processed by 3D printing to form the optical waveguides 102 and block 108, respectively. The optical waveguides 102 can be completely encased by the second material. In this case, the block 108 supporting the optical waveguides 102 is a solid block. Otherwise, the inner part 112 of the block 108 is open i.e. unfilled by the developed second material as shown in FIG. 2. One or more alignment structures 114 such as holes or grooves can be formed in the block 108 for external alignment of the optical waveguides 102. The alignment structures 114 can be formed during the 3D printing process if the second material can be 3D printed. Otherwise, the alignment structures 114 can be formed e.g. by molding or laser etching.

Different waveguide routing configurations can be realized by stacking of the optical waveguides 102 in different planes as shown in FIG. 2. Alternatively, a very large optical network can be formed in a compact 3D cube based on a sub 25 micron waveguide pitch (e.g. 5 um line plus 20 um space) with the waveguides 102 disposed in a single place. The diameter of a typical SM (single-mode) fiber core is about 10 μm. An equivalent 10×10 micron cross-section of an optical interconnect formed of PECS (polymer, epoxy, ceramic, or siloxane) would require approximately 100 scanned slices in the Z-plane. In one embodiment, adjacent ones of the optical waveguides 102 are separated from one another by at least 1.5 μm and the waveguides 102 span a distance of at least 1 cm. Standard 3D printing technologies such as SLA (stereolithography) and 2PP (two photon polymerization) have a resolution of 100 nm or finer, allowing for such waveguide dimensions and spacing. Both SLA and 2PP 3D printing technologies use negative photo sensitive polymers that solidify i.e. turn from a liquid to a solid state when exposed to UV (ultraviolet) or IR (infrared) light.

The optical waveguides 102 are non-intersecting and spaced apart from one another as explained above. In one embodiment, at least some of the optical waveguides 102 comprise first sections 116 formed as horizontal beams and second sections 118 formed as vertical columns. The vertical columns 118 permit the waveguides 102 to change direction at about 90° angles. The vertical columns 118 enable such a sharp turning radius by redirecting light at about 90° angles at each end of the vertical column 118. This way, translucent horizontal beams 116 disposed in different horizontal planes can be connected at sharp angles by a vertical translucent column 118 to realize a single, continuous optical waveguide 102.

Figure 3:
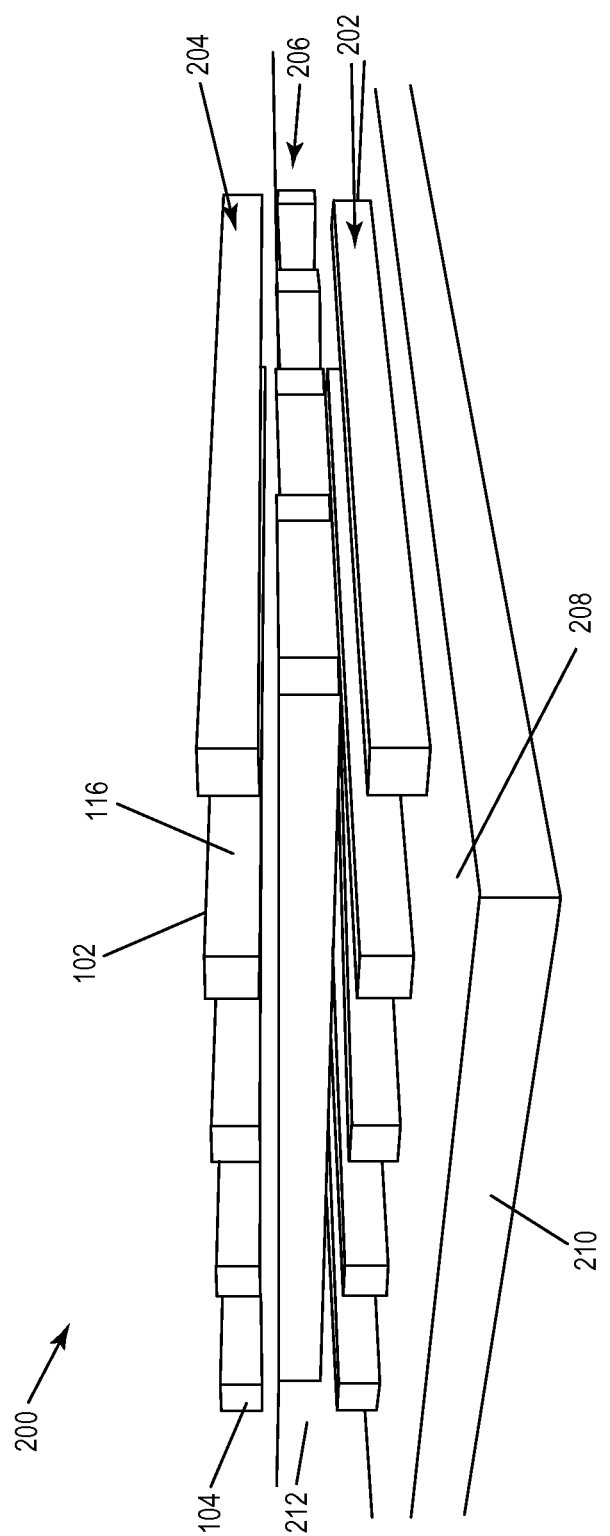
FIG. 3 is a perspective view of an embodiment of translucent horizontal beams of an optical interconnect formed by 3D printing.

FIG. 3 shows an optical interconnect 200 during 3D printing. The bottom and top waveguide layers 202, 204 are utilized for ingress/egress connectivity, and the second (middle) waveguide layer 206 is used for cross-connectivity between the top and bottom waveguide layers 202, 204 so that the optical waveguides 102 can be routed between the ingress and egress sides without intersecting one another. According to this embodiment, the optical waveguides 102 are 3D printed by disposing an adhesion promoter 208 on a surface of a support substrate 210, disposing a polymer 212 on the surface of the support substrate 210 with the adhesion promoter 208, and developing regions of the polymer 212 by 3D printing to form the optical waveguides 102. The undeveloped region of the polymer 212 surrounding the optical waveguides 102 is then removed so that the optical waveguides 102 remain attached to the support substrate 210 by the adhesion promoter 208. Only the horizontal beam sections 116 of the optical waveguides 102 are shown in FIG. 3 for ease of illustration.

Figure 4:
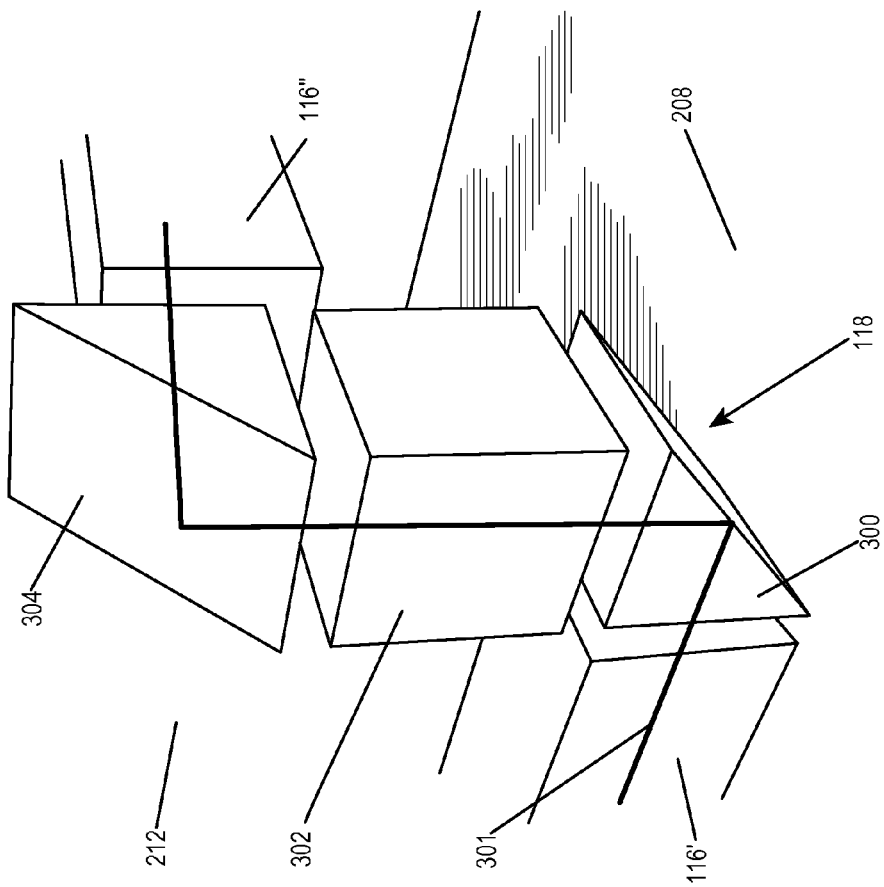
FIG. 4 is a perspective view of an embodiment of a translucent vertical column of an optical interconnect formed by 3D printing.

FIG. 4 shows an embodiment of a vertical translucent column formed by 3D printing for connecting one end of a translucent horizontal beam 116 to an end of another horizontal beam 116 in a different angle to form a single, continuous waveguide 102. The vertical column 118 is shown in spaced apart sections in FIG. 4 for ease of explanation, but in reality these sections are continuous. The horizontal beams 116 and vertical column 118 can be formed e.g. by vertically moving a basin of a 3D printing system which holds a polymer 212. The beams 116 and column 118 are formed one layer at a time by successively moving the basin in a vertical direction. The vertical column 118 includes a first prism 300, a block 302 on the first prism 300 and a second prism 304 on the block 302. The first prism 300 adjoins one end of a first (lower) translucent horizontal beam 116' disposed in a first horizontal plane. The first prism 300 is orientated to reflect incoming light 301 at about a 90° angle into the block 302. The block 302 in turn guides the light in a vertical direction into the second prism 304. The second prism 304 adjoins one end of a second (upper) translucent horizontal beam 116" disposed in a second horizontal plane above the first horizontal beam 116'. The second prism 304 is orientated to reflect the incoming light from the block 302 at about a 90° angle into the upper horizontal beam 116". The vertical column 118 has the form of a twisted periscope with two prisms 300, 304 at right angles, and yields polarization rotation of the propagating light. That is, a light wave traversing such a twisted periscope structure 118 has the property of preserving polarization i.e. the resulting waveguide maintains polarization from ingress to egress side transmission.

Figure 5:
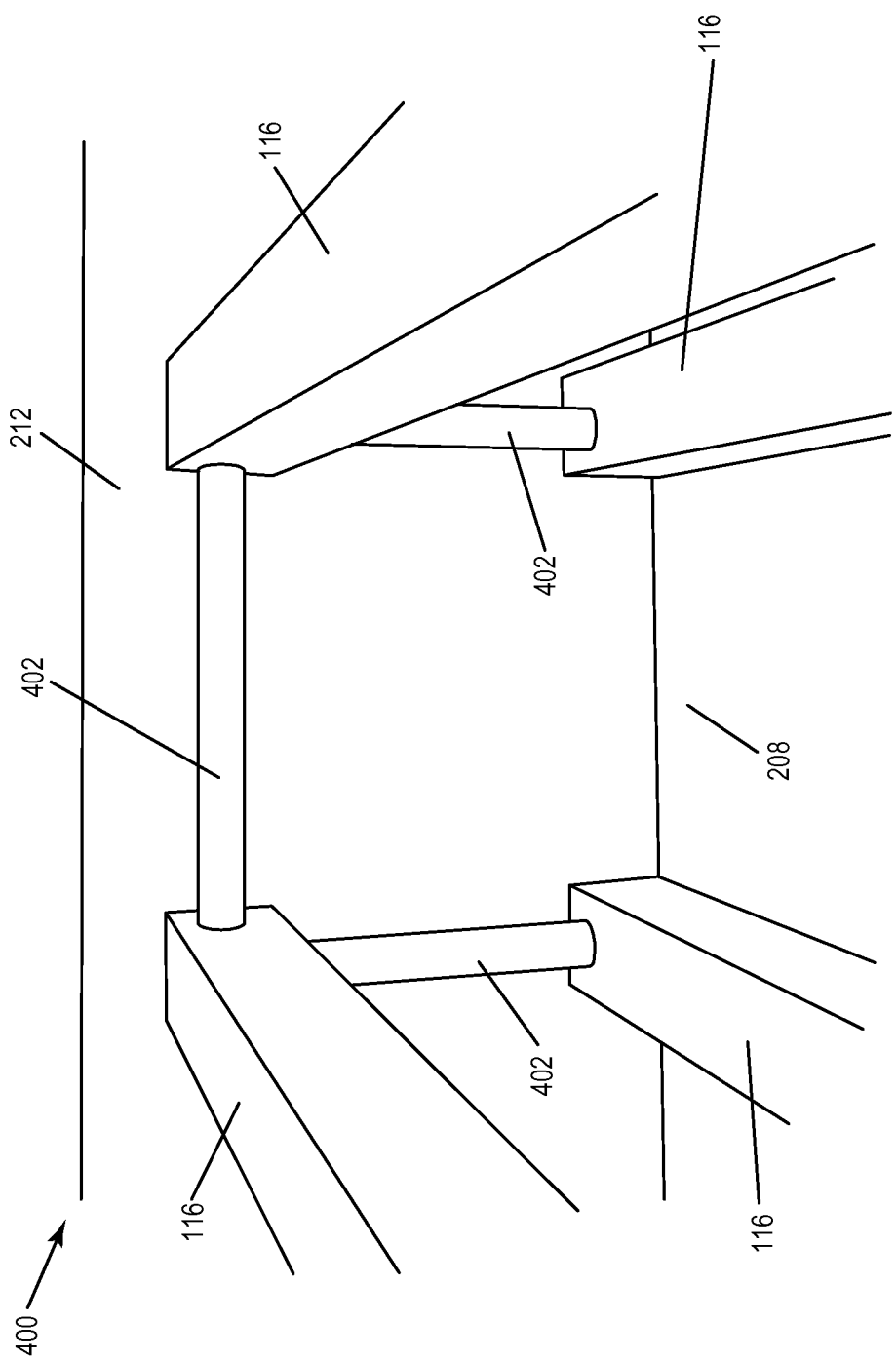
FIG. 5 is a perspective view of an embodiment of an optical interconnect having support structures for optical waveguides formed by 3D printing.

FIG. 5 shows an embodiment of an optical interconnect 400 with support structures 402. The support structures 402 are 3D printed from the same material 212 as the optical waveguides 102 and therefore are translucent. The support structures 402 extend perpendicularly between adjacent ones of the optical waveguides 102 i.e. at about 90° angles so that no appreciable light leaks into the support structures 402 from the optical waveguides 102. To prevent an optical waveguide 102 from collapsing (mechanical deflection) over a large horizontal span such as 1 cm or greater, the perpendicular support structures 402 are added to a digital model or digital representation of the optical interconnect 400.

Figure 6:
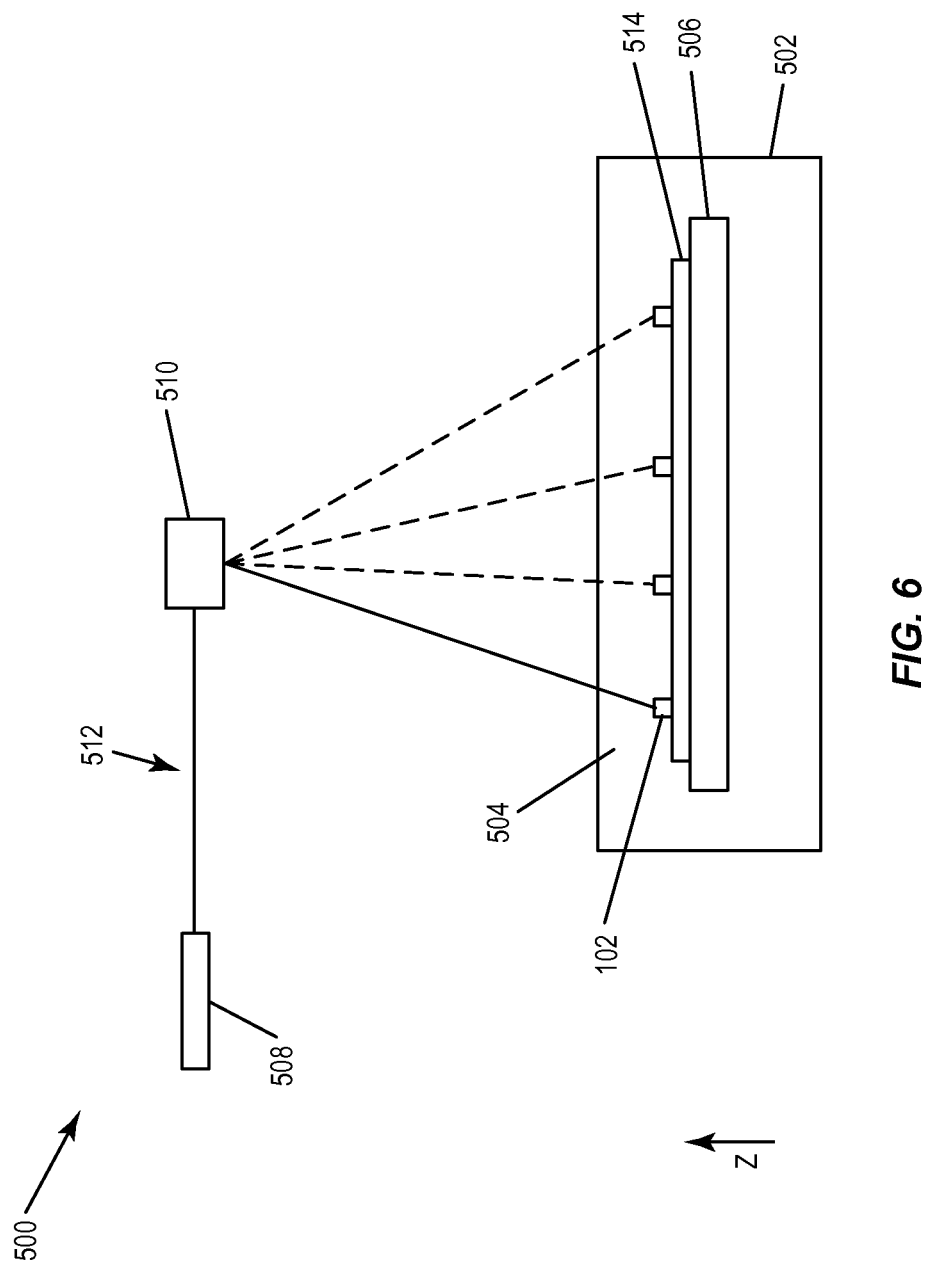
FIG. 6 is a block diagram of an embodiment of a 3D printing apparatus for manufacturing an optical interconnect having optical waveguides.

FIG. 6 illustrates an embodiment of a 3D printing apparatus 500 for manufacturing an optical interconnect of the kind previously described herein. The apparatus 500 comprises a basin 502 configured to hold material 504 capable of guiding electromagnetic waves in the optical spectrum after being cross-linked or polymerized in a region activated by 3D printing. A platform 506 is disposed in the basin 504, and is moveable in the vertical direction (z). The apparatus 500 further comprises a 3D printer comprising a light generating system 508 such as a laser or CCD (charge coupled device) system and an optics system 510 for redirecting light 512 output from the light generating system 508 toward the material 504 in the basin 502. The optics system 510 can redirect the light 512 in multiple directions as indicated in FIG. 6 by the dashed lines. The 3D printer is configured to form a plurality of non-intersecting and spaced apart optical waveguides 102 from the material 504 held in the basin 502. The optical waveguides are formed one layer at a time, by moving the platform 506 in the vertical direction. The 3D printer realizes the digital model of an optical interconnect by controlling the light generating system 508, the optics system 510 and the platform 506 in accordance with the model. Such control by a 3D printer to fabricate a structure in accordance with a 3D model is well known in the art and therefore no further explanation is given in this regard.

At least some of the optical waveguides 102 change direction at least once by about 90° as previously described herein. The 3D printer also encases at least each end of the optical waveguides 102 with a material having a lower index of refraction than the material from which the optical waveguides 102 are formed by 3D printing, to secure the optical waveguides 102. The encasing material is developed by 3D printing.

In one embodiment, the material 504 from which the optical waveguides 102 are formed by 3D printing is a first polymer and the material encasing at least each end of the optical waveguides 102 is a second polymer having a lower index of refraction than the first polymer. According to this embodiment, the 3D printer is configured to remove the undeveloped region of the first polymer surrounding the optical waveguides 102. The 3D printer surrounds the optical waveguides 102 with the second polymer after the undeveloped region of the first polymer is removed. The 3D printer then develops the second polymer at least in a region adjacent the ends of the optical waveguides 102 to harden the second polymer in this region and removes the undeveloped region of the second polymer after the second polymer is hardened in at least the region adjacent the ends of the optical waveguides 102.

In the case of an SLA 3D printer, the basin 502 is filled with a photo-sensitive liquid polymer 504. The platform 506 sinks vertically into the basin 502, forming a thin liquid layer covering the polymer 504 over a seed substrate 514 mounted on the platform 506. A UV/IR laser 508 focused at the top layer of the liquid polymer 504 by the optics system 510 draws a pattern (vector or raster scan), creating the first solidified slice of the optical interconnect. Repetitively, the platform 506 sinks by a sub-micron step placing a layer of liquid polymer over the newly formed sub-structure, followed by UV/IR irradiation which results in the formation of the subsequent slice of the optical interconnect. After several hundred or thousand steps of UV/IR exposures, the formed object is removed from the platform 506 of the apparatus 500 and cleaned e.g. with a solvent (developer). Depending on the formulation used (e.g. polymer, epoxy, ceramic, siloxane), a bake period may be required.

Similarly with 2PP technology, a liquid polymer such as Ormocer (organic modified ceramic) is exposed by a pinpoint beam which solidifies the polymer at different depths by focusing a laser beam at the appropriate depth of field. An immersion oil and glass plate surrounds the Ormocer and permits a high resolution focal beam.

In general the 3D printer apparatus 500 can form one or more alignment structures and/or translucent support structures as previously described herein, if provided in the digital model of the optical interconnect. Also, the ingress and egress ends of the optical waveguides 102 included in the optical interconnect can terminate at the same or different sides of the optical interconnect, depending on the application.

Figure 7:
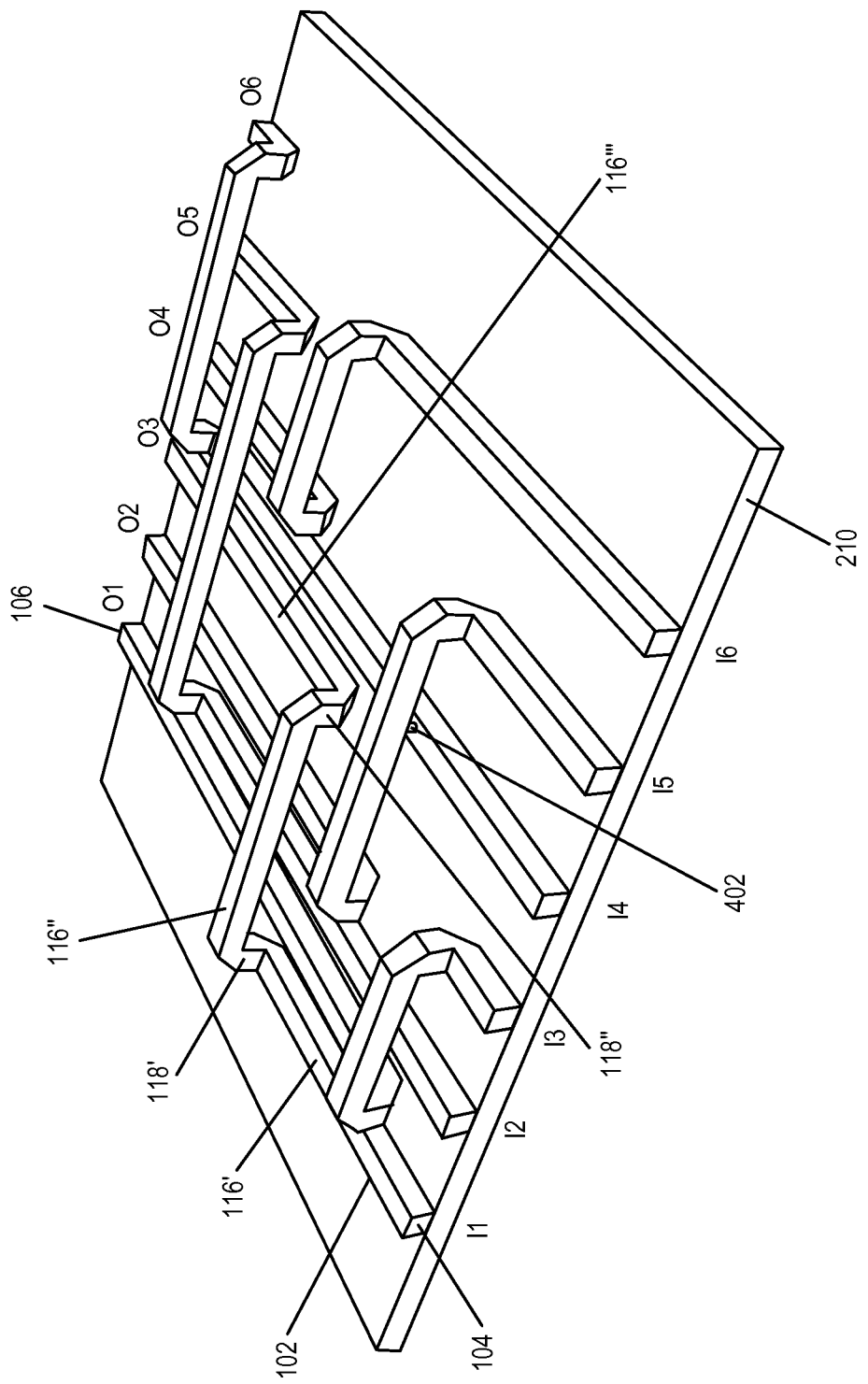
FIGS. 7 through 11 are respective perspective views of an optical interconnect having optical waveguides with different ingress/egress configurations.

FIG. 7 illustrates one embodiment of the optical interconnect where the ingress ends (I1, I2, ..., I6) 104 of the optical waveguides 102 terminate at an opposing side of the block as the egress ends (O1, O2, ..., O6) 106. According to this embodiment, ingress I_a, where a ranges from 1 to 6, is routed to egress O_b, where b ranges from 1 to 6, using two different planes, regardless of the size of the network created. This is accomplished by using an interleaved exit strategy. Particularly, the waveguide 102 with ingress I_a and egress O_b comprises a first horizontal beam 116' that traverses 'x' units deep along the first plane, a first vertical column 118' and second horizontal beam 116" that forms a bridge parallel to the front ingress edge from position 'a' to position 'b' (interleaved midpoint of ingress position) on the upper second plane, and lastly a second vertical column 118" and third horizontal beam 116"' that traverses an exit path on the first plane towards the egress O_b via the third horizontal beam 116"'. The term 'units' as used herein refers to a dimension approximately equal in size to the pitch by which the optical waveguides 102 are spaced apart.

Figure 8:
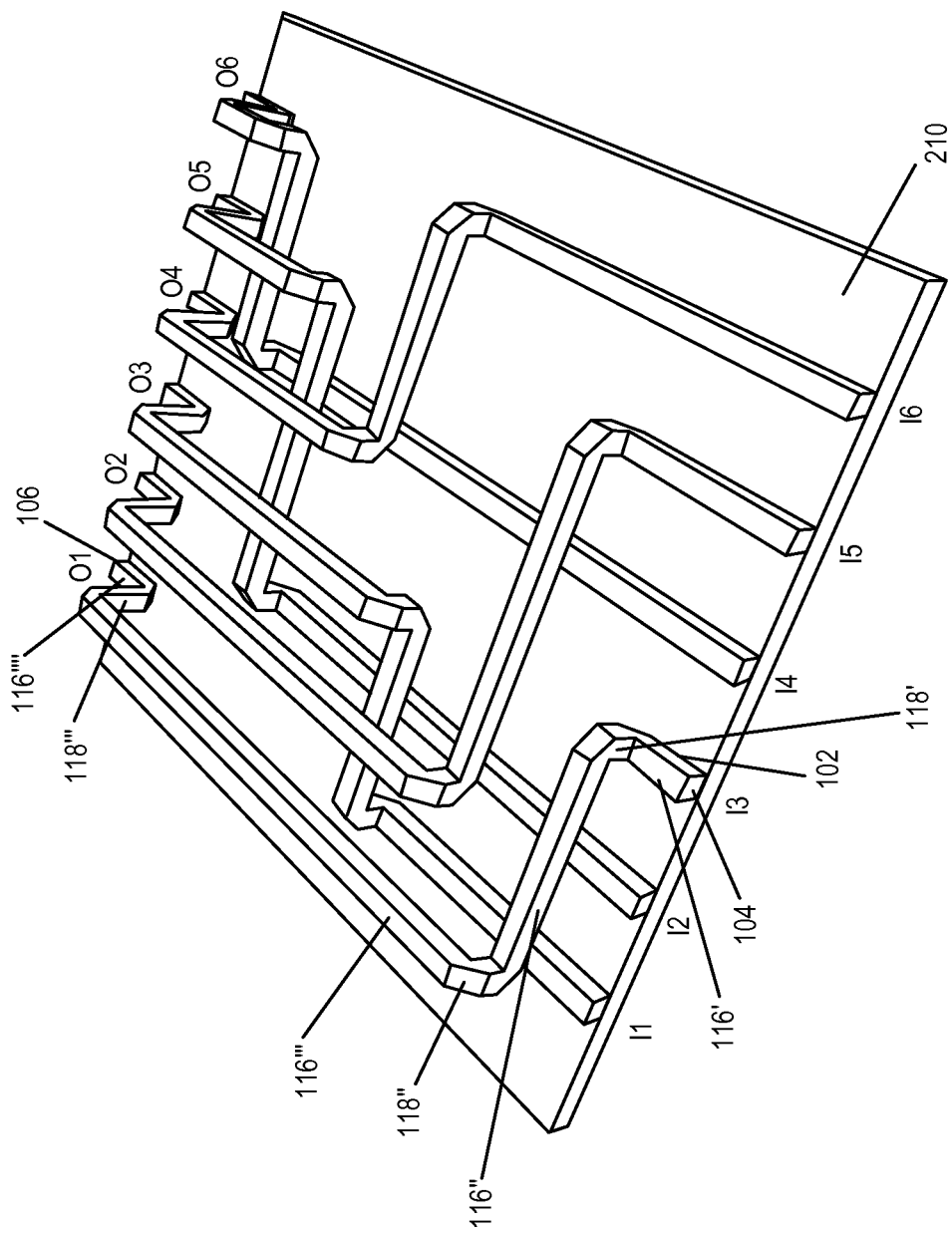

FIG. 8 illustrates another embodiment of the optical interconnect where the ingress ends (I1, I2, ..., I6) 104 of the optical waveguides 102 terminate at an opposing side of the block as the egress ends (O1, O2, ..., O6) 106. According to this embodiment, ingress I_a is routed to egress O_b using three planes, regardless of the size of the network. This is accomplished by using a dedicated third plane exit strategy. Particularly, the waveguide 102 with ingress I_a and egress O_b comprises a first horizontal beam 116' that traverses 'x' units deep along the first plane, a first vertical column 118' and second horizontal beam 116" that forms a bridge parallel to the front ingress edge from position 'a' to position 'b' on the upper second plane, a second vertical column 118" and third horizontal beam 116"' that traverses the third plane towards the egress edge, and finally a third vertical column 118"' and fourth horizontal beam 116"" that exits on the first plane at the egress edge output O_b. Further optimizations can be realized by collapsing a waveguide 102 on the third plane immediately to the first plane where no obstructions exist below the upper third plane.

Figure 9:
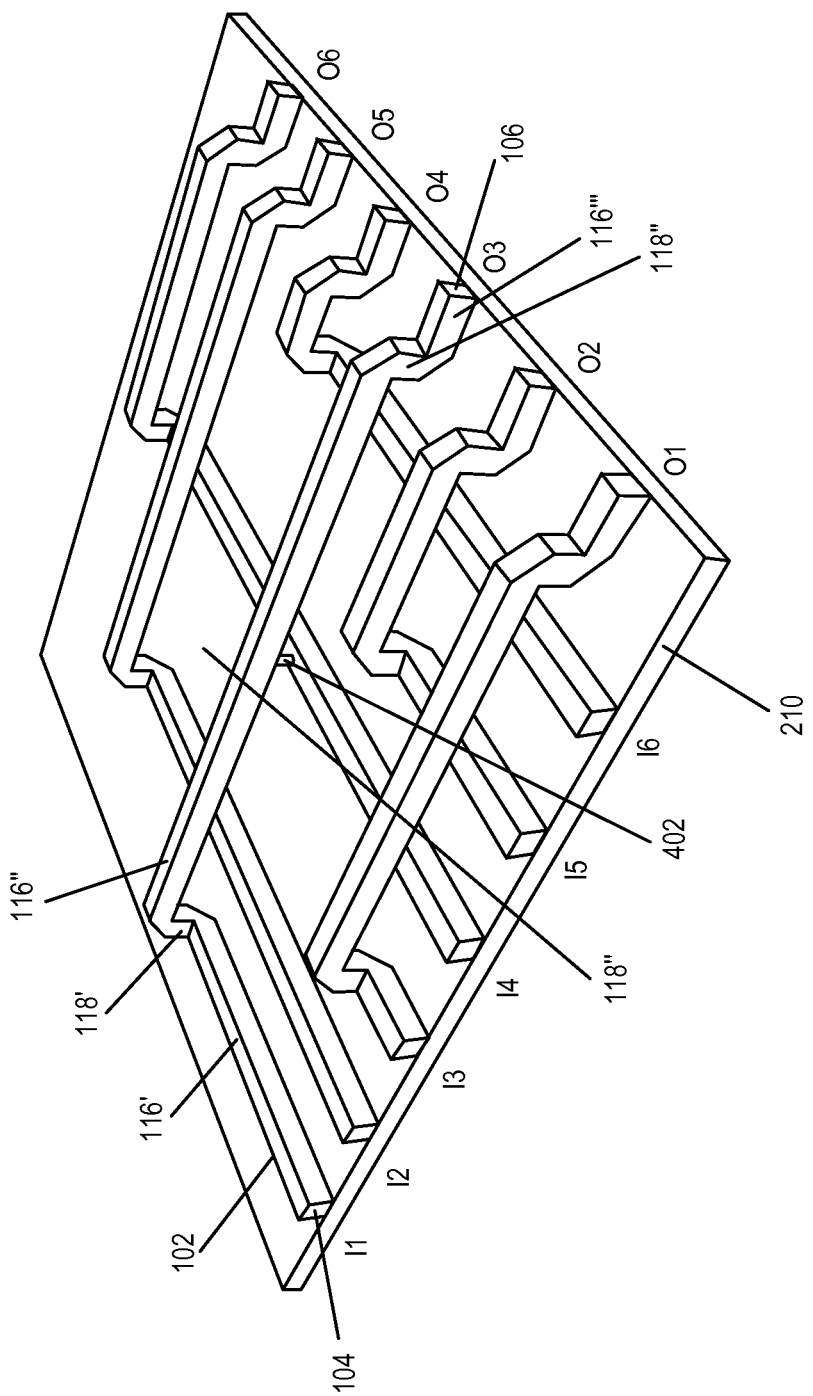

FIG. 9 illustrates an embodiment of the optical interconnect where the ingress ends (I1, I2, ..., I6) 104 and the egress ends (O1, O2, ..., O6) 106 of the optical waveguides 102 terminate at different sides of the block, but not at opposing sides. According to this embodiment, ingress I_a is routed to egress O_b using two planes, regardless of the size of the optical network. This is accomplished by using a dedicated second plane to lateral edge exit strategy. Particularly, the waveguide 102 with ingress I_a and egress O_b comprises a first horizontal beam 116' that traverses 'x' units deep along the first 1st plane, a first vertical column 118' and second horizontal beam 116" that form a bridge parallel to the front ingress edge from position 'a' to the lateral output edge on the upper second plane, and lastly a second vertical column 118" and third horizontal beam 116"' that traverse an exit path along the first plane towards output O_b.

Figure 10:
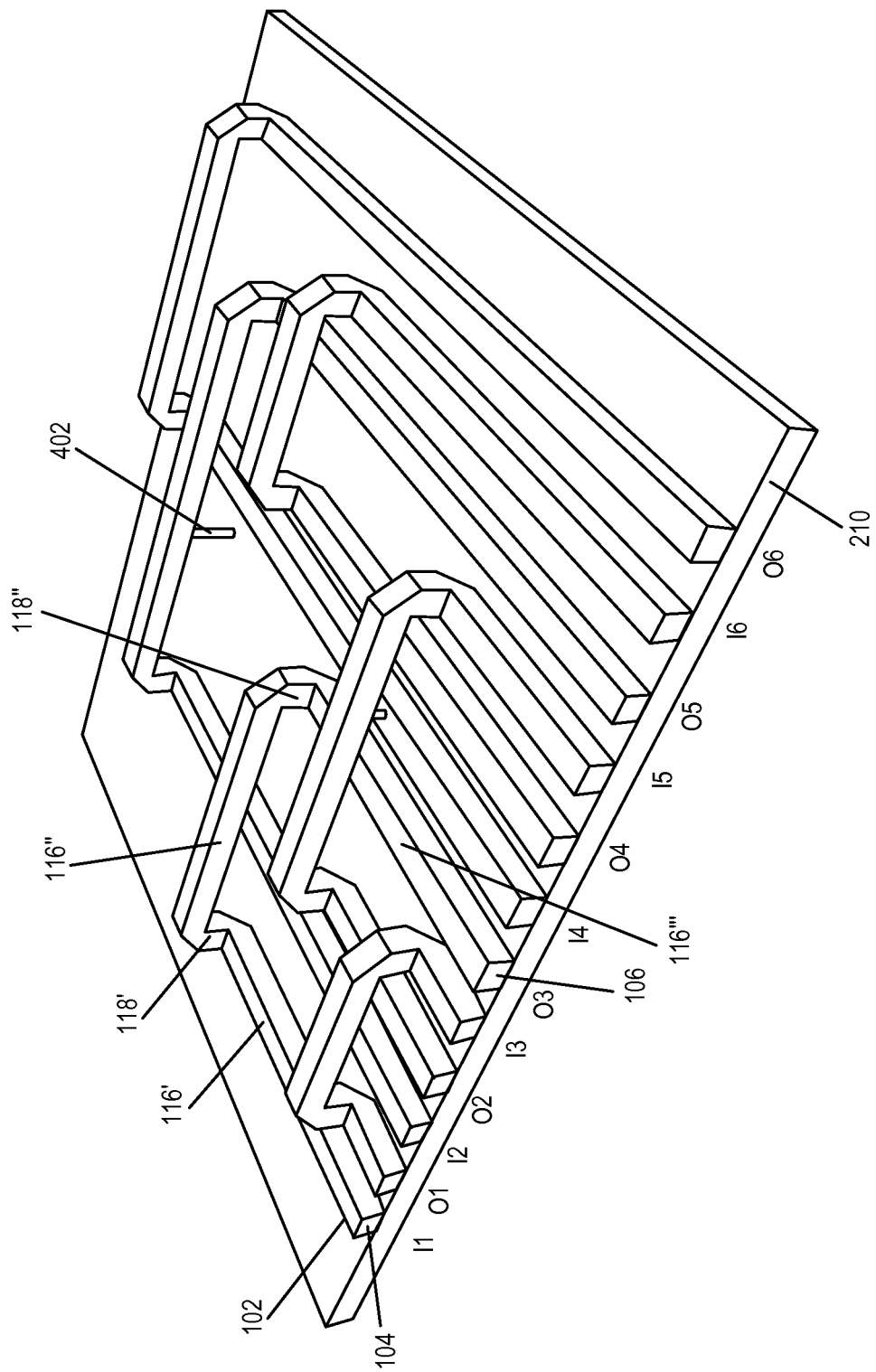

FIG. 10 illustrates an embodiment of the optical interconnect where the ingress ends (I1, I2, ..., I6) 104 and the egress ends (O1, O2, ..., O6) 106 of the optical waveguides 102 terminate at the same side of the block and in the same plane. According to this embodiment, ingress I_a is routed to egress O_b using two planes, regardless of the size of the network created. This is accomplished by interleaving inputs with common channel outputs. Particularly, the waveguide 102 with ingress I_a and egress O_b comprises a first horizontal beam 116' that traverses 'x' units deep along the first plane, a first vertical column 118' and second horizontal beam 116" that form a bridge parallel to the front ingress edge from position I_a to position O_b on the upper second plane, and lastly a second vertical column 118" and third horizontal beam 116"' that traverse a path on the first plane towards the front edge egress O_b.

Figure 11:
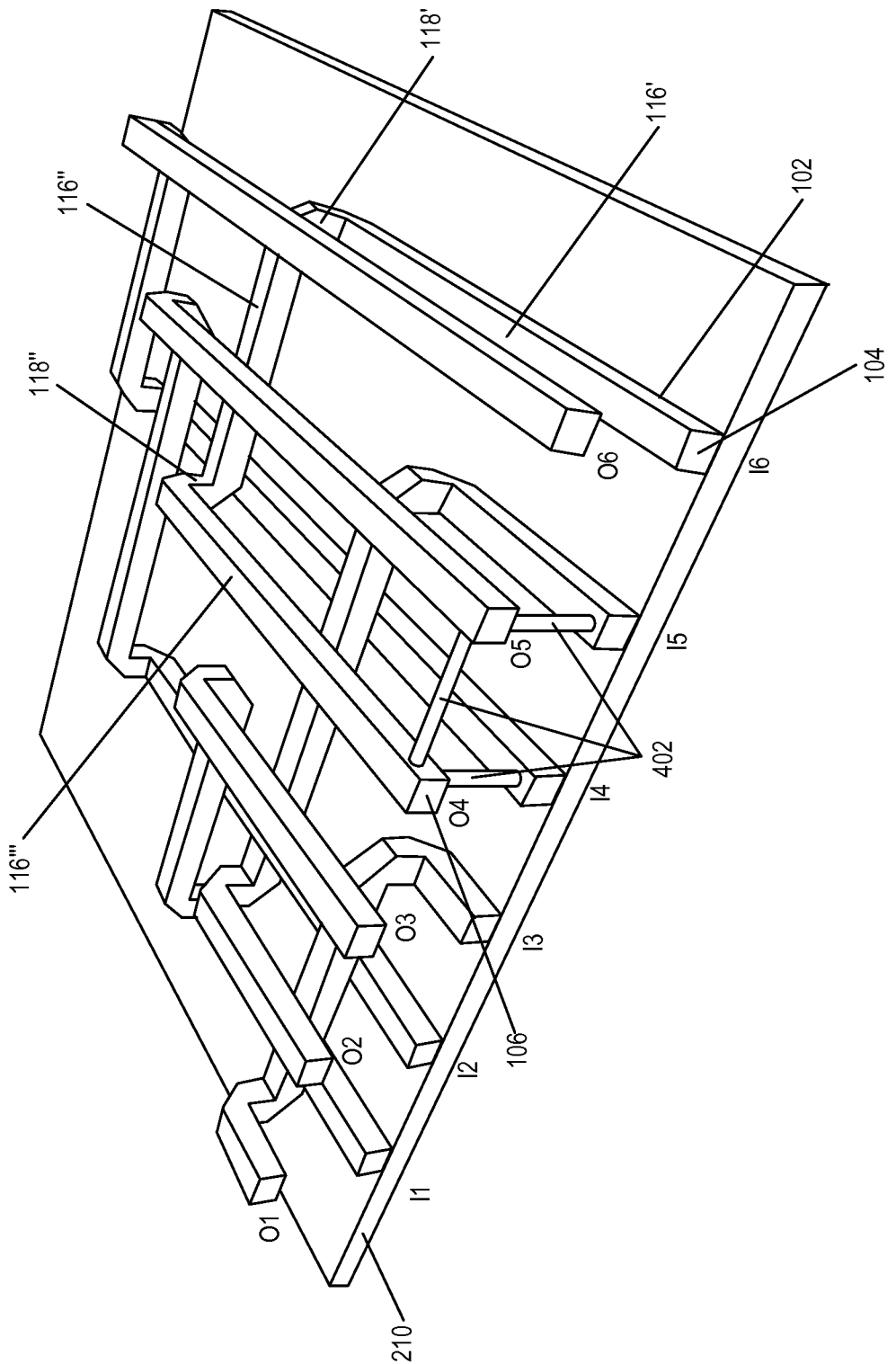

FIG. 11 illustrates an embodiment of the optical interconnect where the ingress ends (I1, I2, ..., I6) 104 and the egress ends (O1, O2, ..., O6) 106 of the optical waveguides 102 terminate at the same side of the block, but in different planes. According to this embodiment, ingress I_a is routed to egress O_b using three planes, regardless of the size of the network created. This is accomplished by using a dedicated third plane exit strategy towards adjacent vertical channel outputs. Particularly, the waveguide 102 with ingress I_a and egress O_b comprises a first horizontal beam 116' that traverses 'x' units deep along the first plane, a first vertical column 118' and second horizontal beam 116" that form a bridge parallel to the front input edge from position 'a' to position 'b' on the upper second plane, and lastly a second vertical column 118" and third horizontal beam 116"' that traverse a path on the third plane towards the front edge egress O_b.

Still other waveguide transpositions are possible. For example in an n×n configuration, the ingress or egress positions may be transposed such that ingress I_a is mapped to physical position I_n-a+1, or egress O_b is mapped to physical position O_n-b+1, allowing the same connector orientation for both opposing ingress/egress side waveguide attachments.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. An optical interconnect, comprising:
 a plurality of non-intersecting and spaced apart optical waveguides 3D printed from a first material that guides electromagnetic waves in the optical spectrum after being cross-linked or polymerized in a region activated by 3D printing, at least some of the optical waveguides changing direction at least once by about 90°, and comprised of first sections formed as horizontal beams and second sections formed as vertical columns, wherein the second sections further comprise:
  a first prism at one or both ends of the first sections of the optical waveguides disposed in the same plane, each of the first prisms orientated to reflect incoming light at about a 90° angle, a block on each of the first prisms, and a second prism on each of the blocks, each of the second prisms orientated to reflect incoming light at about a 90° angle; and a second material encasing at least each ingress and egress end of the optical waveguides to secure the optical waveguides in a block, the second material having a lower index of refraction than the first material.

2. The optical interconnect of claim 1, wherein adjacent ones of the optical waveguides are separated from one another by at least 1.5 µm.

3. The optical interconnect of claim 1, wherein the optical waveguides are completely encased by the second material and the block is a solid block.

4. The optical interconnect of claim 1, further comprising one or more alignment structures for external alignment formed in the second material.

5. The optical interconnect of claim 1, further comprising a plurality of support structures 3D printed from the first material and extending perpendicularly between adjacent ones of the optical waveguides so that no appreciable light leaks into the support structures from the optical waveguides, the support structures configured to provide mechanical support to the optical waveguides.

6. The optical interconnect of claim 1, wherein the optical waveguides span a distance of at least 1 cm.

7. The optical interconnect of claim 1, wherein the ingress ends of the optical waveguides terminate at a different side of the block as the egress ends.

8. The optical interconnect of claim 7, wherein the ingress ends of the optical waveguides terminate at an opposing side of the block as the egress ends.

9. The optical interconnect of claim 1, wherein the ingress ends of the optical waveguides terminate at a different plane than the egress ends.

* * * * *